UNITED STATES PATENT OFFICE.

WILLIAM A. STOCKER, OF BANGOR, PENNSYLVANIA.

PUTTING COLORED LINES ON SCHOOL-SLATES.

SPECIFICATION forming part of Letters Patent No. 523,604, dated July 24, 1894.

Application filed April 12, 1894. Serial No. 507,498. (No specimens.)

*To all whom it may concern:*

Be it known that I, WILLIAM A. STOCKER, a citizen of the United States, residing at Bangor, in the county of Northampton, State of Pennsylvania, have invented certain new and useful Improvements in Putting Colored Lines on School-Slates, of which the following is a specification.

This invention pertains to a process or method of treating slates for placing colored lines thereon, for school uses. It has for its object primarily to produce a slate with colored lines or designs at a minimum expense by a process which shall be simple, rapid and reliable.

Other objects and advantages of the invention will hereinafter appear and the novel features thereof will be specifically defined by the appended claims.

In carrying out my invention I first take the slates and place them in a rack so that they will be isolated from each other in order that they may be better treated and the water allowed to drain off rapidly and evaporate quickly after taking them out of the bath hereinafter described. It is necessary to dry them rapidly in order to avoid the soda and other materials employed leaving a mealy coating on the slates. The rack with the slates is then immersed in a tank or receptacle containing a hot solution of sal soda and a very little sugar, or any suitable binder that will serve to bind the soda and assist in preventing the above-mentioned mealy coating on the slates. The specific gravity may be varied within certain limits without materially affecting the result. The rack with the slates is then removed from the solution and dried as rapidly as possible. After they are dried they are ruled in any suitable manner; any desired designs may be made upon them. They must then be thoroughly brushed to remove all dust and soda that may have accumulated in the grooves. The slates are then coated with a paste or paint, composed by preference of white lead, zinc, litharge and a little oil and japan, or any good substitute for a filler. This is applied in any suitable manner with sufficient pressure to force it solidly into the grooves. The filler should be of a consistency about like that of thick cream. After being thus coated the slates are baked for about twenty-four hours, or until the coating has hardened. After being baked sufficiently to harden the coating the slates are dipped, one at a time, preferably, into luke warm water and quickly washed. The sal soda, under the filler, as the water reaches it, decomposes the grease in the paint and thus loosens it; this must then be very quickly washed off before it attacks the filling in the grooves. The lines are then rubbed even with the slate surface and all surplus filler removed in any suitable way, as by pumice stone and flour of emery. The slates are next washed and rinsed in clean water and afterward rubbed with a woolen rag on which is put a very small quantity of grease as furniture oil. This must be applied to the slates while wet to insure the very thinnest application and prevent greasiness. This will also clear and remove any scratches caused by the pumice and emery.

While the materials above described are those I preferably employ in my process I do not restrict myself thereto, as they may be varied; for instance, instead of the sal soda I may employ any size that will coat the slates evenly and that will by chemical action loosen the paint when water is applied, thus facilitating cleaning.

Other modifications in detail may be resorted to without departing from the spirit of the invention or sacrificing any of its advantages.

What is claimed as new is—

1. The process of treating slates, which consists in immersing the same in a solution of sal soda, drying, applying a coating or filler of oil paint whose oily matter may be acted upon by the sal-soda and rendered soluble, baking, subjecting to warm water, and afterward polishing, substantially as specified.

2. The process of treating slates, which consists in immersing the same in a hot solution of sal soda and a binder, drying the same, marking the design thereon, applying a plastic coating of oil paint whose oily matter may be acted upon by the sal-soda and rendered soluble, baking, subjecting the same to the influence of warm water, washing, polishing and cleaning, as set forth.

3. The herein described method of treating slates which consists in immersing the same in a solution of sal-soda and a binder, removing and drying the same, marking thereon a design extending into the body of the slate, applying a plastic coating of oil paint whose oily matter may be acted upon by the sal-soda and rendered soluble over the design, afterward baking, removing the coating and polishing the slate to render the design flush with the surface of said slate, as set forth.

In testimony whereof I affix my signature in presence of two witnesses.

WILLIAM A. STOCKER.

Witnesses:
 PHILIP J. ALBERT,
 HERBERT M. GRUVER.